(No Model.)

G. H. KILE.
TRAP FOR FISH OR GAME.

No. 386,591. Patented July 24, 1888.

WITNESSES:
Phil C. Dieterich
C. Sedgwick

INVENTOR,
G. H. Kile
BY Munn & Co
ATTORNEY.

UNITED STATES PATENT OFFICE.

GEORGE H. KILE, OF MOUND VALLEY, KANSAS.

TRAP FOR FISH OR GAME.

SPECIFICATION forming part of Letters Patent No. 386,591, dated July 24, 1888.

Application filed May 22, 1888. Serial No. 274,705. (No model.)

*To all whom it may concern:*

Be it known that I, GEORGE H. KILE, of Mound Valley, in the county of Labette and State of Kansas, have invented a new and Improved Trap for Fish or Game, of which the following is a full, clear, and exact description.

This invention relates to traps for catching fish or game, and has for its object to provide a serviceable and effective trap adapted to catch fish or animals.

The invention consists in a trap for this purpose constructed and arranged as hereinafter described and claimed.

Reference is to be had to the accompanying drawings, forming a part of this specification, in which similar figures of reference indicate corresponding parts in all the views.

Figure 1:
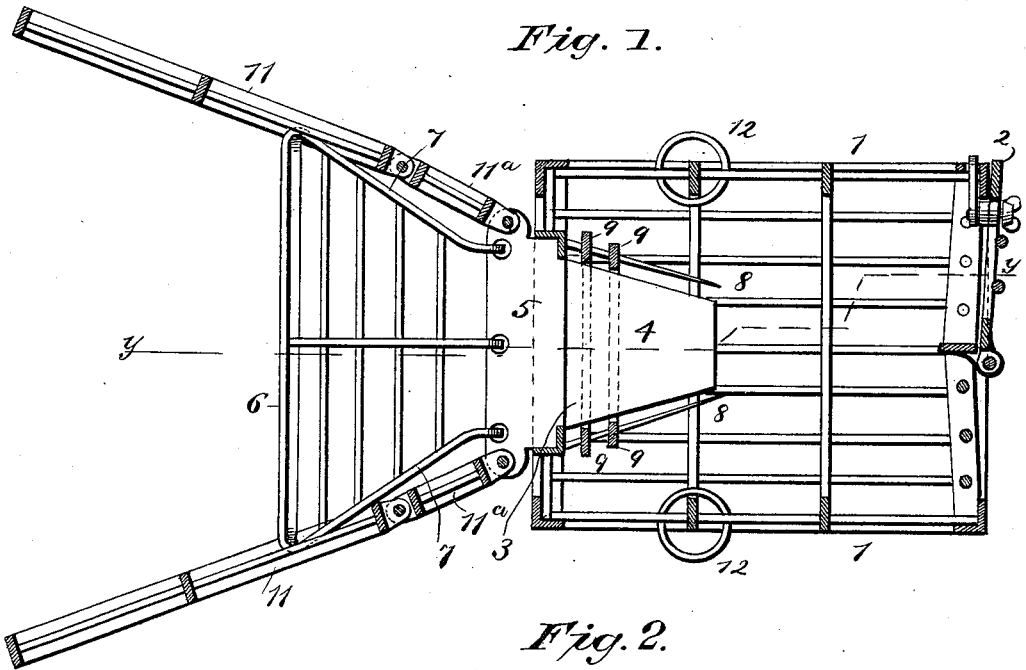
Figure 2:
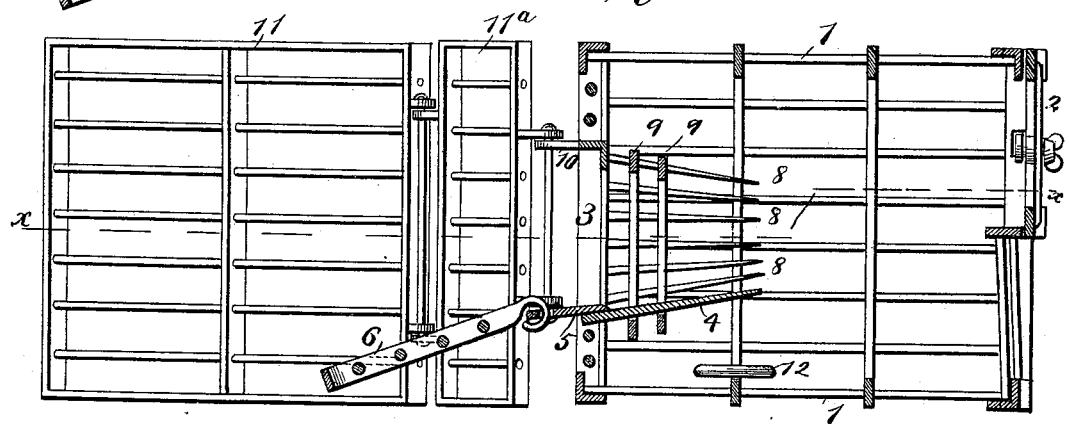
Figure 3:
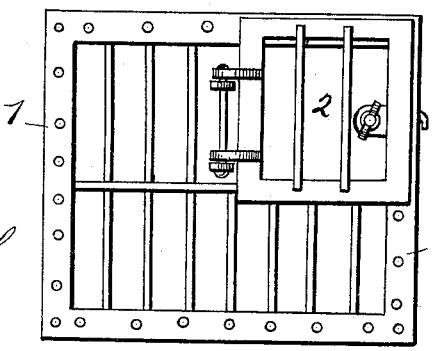

Figure 1 is a plan view of the invention in horizontal section on the line $x\ x$, Fig. 1. Fig. 2 is a side view of the invention in vertical section on the line $y\ y$ of Fig. 1, and Fig. 3 is a rear end view thereof.

In carrying out this invention I employ a cage, 1, of suitable size, provided at its rear end with a hinged door, 2, secured in any suitable manner, and by means of which the fish or animal caught may be removed.

The front of the cage is formed with an opening, 3, for the entrance of the fish or animal to be caught, which opening is provided at its bottom with an inclined plate or platform, 4, extending upward into the cage 1 and having a ledge or shelf, 5, extending outward from the opening 3. To the shelf 5 is hinged a grating, 6, having outwardly inclined sides 7. From the inner sides and top of the opening 3 project converging pointed rods 8, braced by bars 9, and forming with platform 4 a passage-way narrowing to an opening within the cage 1. On the outside of the opening 3, at its sides, are hinged to uprights mounted in the brackets 10 and shelf 5 double folding hinged gratings 11, which serve as guides to the openings 3, the short sections 11ª of the gratings 11 being of a length to permit the longer sections thereof to fold compactly upon the sides of the cage. The cage 1 may be provided with rings 12, as shown, by which it can be secured with chains or ropes in any desired position.

When the trap is set in position, the grating 6 will extend down in an inclined position from the opening 3 with the gratings 11, forming guides at the sides thereof, as shown. The fish or animal entering between the guides 11 passes over the inclined grating 6 into the opening 3 and through the passage-way formed by platform 4 and rods 8, and upon entering the cage 1 cannot return through the passage-way.

If desired, when the trap is used for animals, it may be elevated on a suitable support, and in this position the inclined grating 6, with its end resting on the ground, will prevent an animal approaching the entrance 3 from passing beneath the cage 1, while the guide-gratings 11 may, owing to the inclined sides 7 of the grating 6, be swung inward over the sides 7 and secured in place to form a narrow entrance at the outer ends of the gratings 11. When the trap is to be transported to any place, the gratings 11 and 6 may be folded up out of the way against the cage 1, the gratings 11, owing to their being double, being permitted to fold up against the end and sides of the cage.

By means of a trap constructed as herein described animals or fish may be caught in the most effective manner.

Having thus described my invention, what I claim as new, and desire to secure by Letters Patent, is—

1. A trap for fish or game, consisting of a cage formed with an opening having an inwardly-tapering passage-way, a grating hinged to the lower side of the opening, and double folding guide-gratings hinged to the sides of the opening, substantially as described.

2. A trap for fish or game, consisting of a cage provided with an opening having an inwardly-tapering passage-way, the bottom of which is formed of a platform and its top and sides of pointed rods, and a grating hinged to the lower side of the opening, and double folding gratings hinged to the sides of the opening, substantially as described.

3. A trap for fish or game, consisting of cage 1, having opening 3, with an internal passage-way formed of platform 4 and converging-pointed rods 8, and having the external shelf, 5, the grating 6, with outwardly-inclined sides 7, hinged to shelf 5, and the double folding guide-gratings 11, hinged at the sides of opening 3, substantially as described.

GEORGE H. KILE.

Witnesses:
JOHN R. BEDELL,
A. M. GARRINGER.